(12) United States Patent
Toda

(10) Patent No.: US 7,161,702 B2
(45) Date of Patent: Jan. 9, 2007

(54) METHOD AND APPARATUS FOR GENERATING A PRINT COMMAND CAPABLE OF GENERATING IMPROVED STABLE THROUGHPUT

(75) Inventor: Masanari Toda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 921 days.

(21) Appl. No.: 10/370,765

(22) Filed: Feb. 24, 2003

(65) Prior Publication Data
US 2005/0219592 A1 Oct. 6, 2005

(30) Foreign Application Priority Data
Feb. 28, 2002 (JP) .............................. 2002-054655

(51) Int. Cl.
G06F 3/12 (2006.01)
G06K 15/00 (2006.01)

(52) U.S. Cl. .................... 358/1.15; 356/1.16; 356/1.14

(58) Field of Classification Search ............... 358/1.15, 358/1.14, 1.16, 1.9, 1.6, 1.18, 1.11, 1.17, 358/524
See application file for complete search history.

(56) References Cited

U.S. PATENT DOCUMENTS

| 6,734,989 | B1 * | 5/2004 | Tsunekawa | ................. 358/1.9 |
| 7,103,833 | B1 * | 9/2006 | Sano et al. | ............... 715/501.1 |
| 2001/0040699 | A1 * | 11/2001 | Osawa et al. | |
| 2003/0002063 | A1 | 1/2003 | Oomura et al. | ............ 358/1.11 |

* cited by examiner

Primary Examiner—Douglas Q. Tran
(74) Attorney, Agent, or Firm—Fitzpatrick, Cella, Harper & Scinto (57) ABSTRACT

The present invention is directed to providing, in an apparatus and method for generating print commands suited to a particular printing apparatus, both high-speed printing of simple pages that are relatively easily processed as well as improved continuous throughput of complex pages that are relatively difficult to process. The apparatus obtains and integrates data size and command numbers from the generated print commands and switches the print command generation from page units to band units when it appears likely that the page memory will be exceeded, thus mixing page unit print commands and band unit print commands in the same page to achieve improved throughput.

25 Claims, 9 Drawing Sheets

METHOD AND APPARATUS FOR GENERATING A PRINT COMMAND CAPABLE OF GENERATING IMPROVED STABLE THROUGHPUT

FIELD OF THE INVENTION

The present invention relates to a method and apparatus for generating a print command capable of obtaining stable throughput.

BACKGROUND OF THE INVENTION

Figure 8:
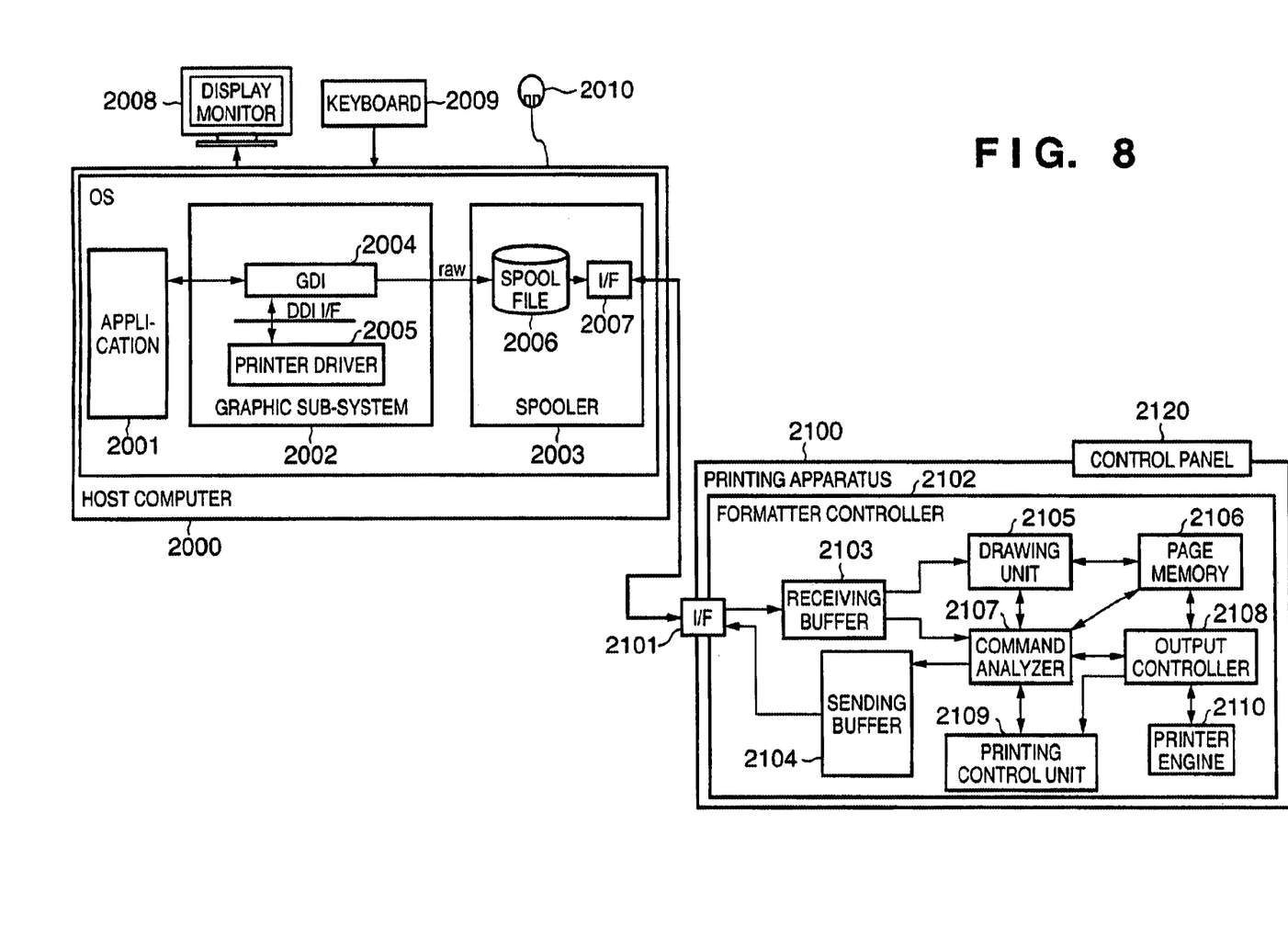
FIG. 8 is a block diagram showing a typical example of a conventional printing system configuration.

FIG. 8 is a block diagram showing a typical example of a conventional printing system configuration, in which a host computer and a printing apparatus are communicably connected to each other.

Ordinarily, a host computer 2000 and a printing apparatus 2100 are connected by either a parallel interface or USB called a centronics interface (IEEE 1284), a serial interface such as an IEEE 1394 or a network interface such as 10BASE-T.

At the host computer 2000, application software 2001 such as a word processing program or a spreadsheet program (hereinafter referred to as an application) is run on an OS (Operating System) such as Microsoft's Windows.

Printing using such application programs is done using the functions of the graphic sub-system within several sub-systems that the OS provides from within the programs. In Windows, for example, the graphic sub-system 2002 is called a Graphics Device Interface (GDI)—here denoted by the reference numeral 2004—and controls image data processing for the display device and printing apparatus.

In order to overcome the problem of dependence, that is, the need to change or install software with each change in display device and printing apparatus, the GDI 2004 actively links modules called device drivers and processes the output of the devices and apparatuses. The device driver for the printing apparatus is called a printer driver 2005. With the printer driver 2005, it is necessary to prepare a function group called a Device Driver Interface (DDI) to be loaded into the device driver according to the performance and capabilities of the corresponding device.

The application API (Application Programming Interface) call is configured so that the DDI function group is called as appropriate by the GDI 2004 performing device driver data conversion so as to execute a given printing process. At the GDI 2004, print requests from the application 2001 are sequentially processed using the printer driver 2005.

In general terms, printer drivers can be divided into two types: image mode printer drivers, which even draw the image data format (bit map format) during output, and PDL mode printer drivers, which generate a PDL (Page Description Language) which is a command for the printing apparatus to interpret and draw.

Assume that the printer driver 2005 is a PDL mode printer driver. A PDL mode printer driver generates a PDL command with every call of the DDI function, and in this case the generated print command is sequentially and repeatedly stored as a single-page spool file 2006 by the GDI 2004. When a page worth of data is in place, the GDI 2004 interprets the PDL using the interface (I/F) 2007 and sends it to a drawing-capable printing apparatus.

The printing apparatus 2100 temporarily stores the PDL command (that is, the print command) in a buffer 2103 and analyzes it with a command analyzer 2107. The printing apparatus 2100 then uses the results of that analysis to generate intermediate data that can be processed at high speed by the printing apparatus and stores the data in the intermediate language storage area of a page memory 2106. When a page worth of intermediate data accumulates in the page memory 2106, a list structure (also called a band list or a display list) is created with each band region that is the processing unit within the printing apparatus.

The intermediate language is drawn by the hardware or software for the band memory area (hereinafter simply band memory) within the page memory 2106 in band list units.

The image data generated in the band memory is synchronized with the action of the printer engine (for example the rotation of a photosensitive drum) and converted into a video signal (a process called shipping). By using two band memories, interchangeably and repetitively, it is possible to synchronize the drawing and shipping with the printer engine operation.

However, in a PDL mode printer driver, the data taken from the DDI function is all generated as draw commands, so when issuing a large number of draw commands from the application, the drawing time can exceed the shipping time in what is called a print overrun. Accordingly, in the conventional printing apparatus, normal printing is achieved by the operation of a routine like the following:

1. Sub-close, involving the following steps (1) When the intermediate language no longer fits in the page memory, the intermediate language data stored up to that point is drawn and compressed (using PackBits, Run-length, JBIG compression, etc.) using the band memory and retained as intermediate data (composed of all the bands relating to the drawing object).

(2) The intermediate language data that has already been drawn is deleted, increasing the page memory empty space.

(3) The intermediate language that did not fit into the page memory is stored in the newly emptied space. If an entire page fits, the compressed image data (intermediate data) re-registered in (1) is treated as one intermediate language, enabling band drawing that is synchronized with the printer engine (called synchronized band drawing).

(4) If after the above-described steps a page of intermediate language still does not fit within the memory, then process (1) is executed once again. (Previously registered compressed image data is initially drawn, on top of which new intermediate language data is drawn and the entire structure is re-compressed.)

2. Pre-band (pre-rendering), involving the following:

When intermediate language data is concentrated at a single band, drawing and printer engine operation can get out of synch. During intermediate language registration, a band deemed to assume such a state is previously drawn in a band memory previously prepared prior to the activation of the printer engine.

Such methods can provide adequate printing, but since high-speed synchronous band rendering is not possible, printing speed declines.

On the other hand, where the printer driver 2005 is an image mode type printer driver 2005, printing is accomplished by securing bit map memory space inside the printer driver 2005 in units of pages or bands, with data drawn directly to the bit map memory every time the DDI function is called.

The generated print commands are bit map data, and after a page of such data is stored as a spool file 2006 as in the PDL mode the data is sent to the printing apparatus 2100 via the I/F 2007. Thus, with the image mode type of printer driver, in order to output the final drawing results, the data size never exceeds one full page at most.

At the printing apparatus 2100, the same types of processes are performed as when a PDL is received. However, since the data sent is strictly image data, if configured to be able to accept a full page worth of image data, it will not experience the extremely slow processing like that of the PDL mode no matter what type of data is involved. In other words, the image mode printer driver can deliver steady throughput.

The foregoing advantages and disadvantages of the various printer driver modes may be summed up as follows:

PDL mode printer driver:

Advantage: If the data fits into the printing apparatus internal memory, the driver processes are simple (=high speed), the data size to be transmitted to the printing apparatus is small and the printing apparatus can print at high speed.

Disadvantage: If a large volume of data or complex data is sent as a PDL command, there is a strong possibility that printing speed will decline drastically in printing apparatuses with limited memory resources.

image mode printer driver:

Advantage: Since there is an upper limit to the size of the print command sent to the printing apparatus, the printing apparatus can operate at a steady speed.

Disadvantage: Even with pages that can be drawn simply (=quickly), image data in units of pages becomes print commands, so the length of time that the host computer is occupied while the printer driver operates, the print data transfer time and the processing time at the printing apparatus when processing an average page are all longer than is the case with a PDL mode printer driver.

Figure 9:
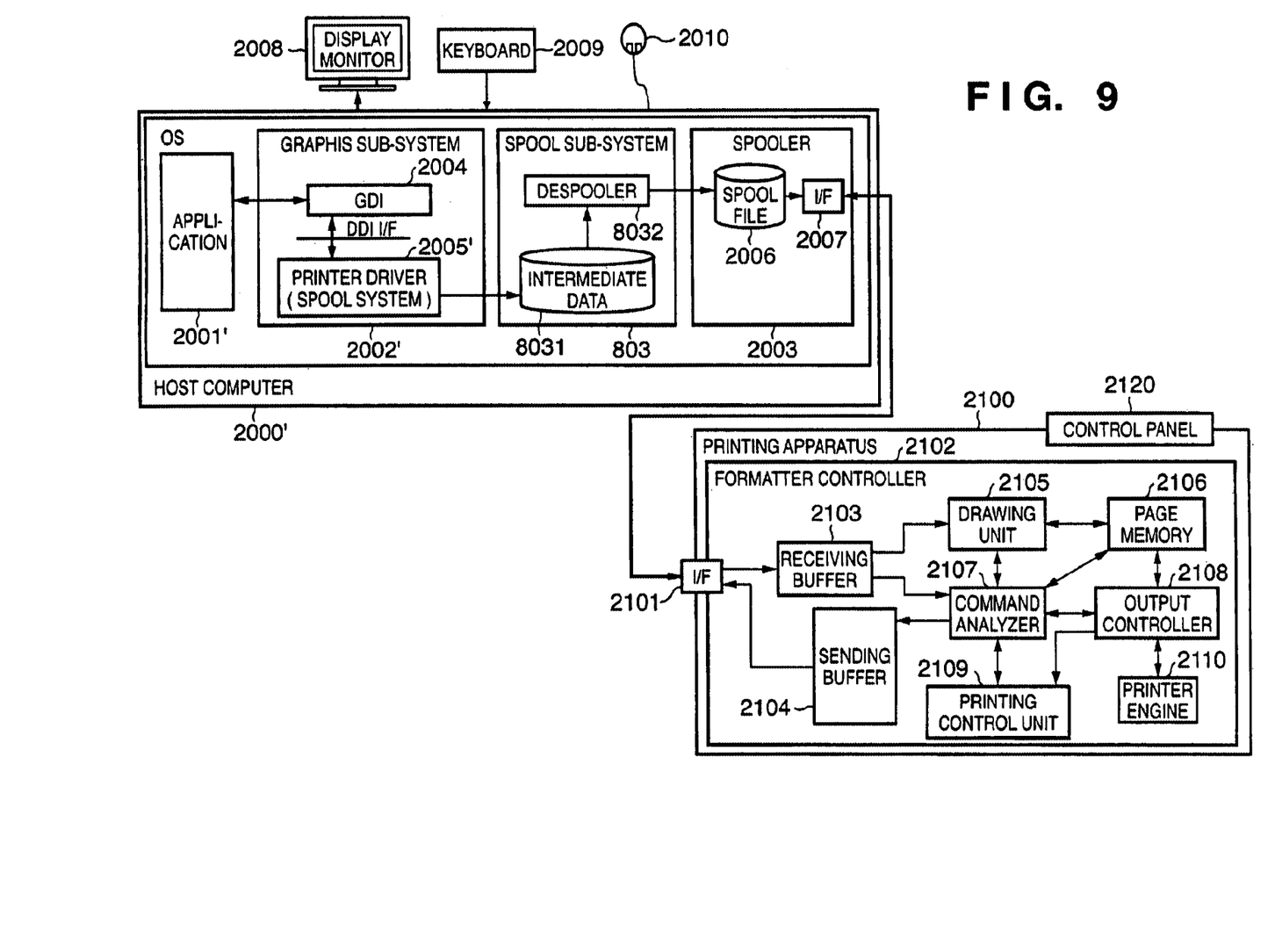
FIG. 9 is a block diagram showing an example of a basic configuration of a conventional printing system that is an improvement on the configuration shown in FIG. 8.

FIG. 9 is a block diagram showing an example of a basic configuration of a conventional printing system that is an improvement on the configuration shown in FIG. 8.

As a means of solving the problems of both types of printer drivers, providing a spool sub-system composed of a storage apparatus 8031 for storing the generated intermediate data and a de-spooler 8032 while giving the printer driver 2005' a spooling capability as shown in FIG. 9 has been proposed.

In such a system, a page of intermediate data generated by the printer driver 2005' is held in the storage apparatus 8031, which is analyzed by the de-spooler 8032. Complex pages are drawn and converted into image data, with the results being bundled up by the print command so as to generate print data (the same process as with an image mode printer driver). By performing this process it is possible to reduce the processing load on the printing apparatus, but because the data must be spooled once for the intermediate data analysis, the time it takes until the first page is printed in particular is longer than when no spooling is involved.

SUMMARY OF THE INVENTION

Accordingly, it is an object of the present invention to provide, in an apparatus and method for generating print commands suited to a particular printing apparatus, both high-speed printing of simple pages that are relatively easily processed as well as improved continuous throughput of complex pages that are relatively difficult to process.

The above-described object of the present invention is achieved by a print command generating apparatus for generating print commands capable of being interpreted and printed by a particular printing apparatus, the print command generating apparatus comprising:

a command generating unit for generating print commands in page units or band units;

a storage unit for storing information relating to page unit print commands generated by the command generating unit; and a control unit for causing the command generating unit to generate page unit print commands from the start of each page to be printed and to generate band unit print commands by realigning remaining print commands in band units if information relating to the page unit print commands stored in the storage unit satisfies a certain condition.

Preferably, the print command generating apparatus further comprises a switching data insertion unit for inserting data indicating a switch in print commands between the page unit print commands and the band unit print commands.

Preferably, in the print command generating apparatus describe above, the information relating to the page unit print commands includes a value indicating accumulated data size by type of print command, and the certain condition is that the value indicating accumulated data size exceeds a predetermined threshold size.

Preferably, in the print command generating apparatus described above, the predetermined threshold size is set according to the storage capacity of the storage unit of the printing apparatus.

Preferably, in the print command generating apparatus described above, the information relating to the page unit print commands includes a value indicating either the total number of print commands or the number of print commands by type, and the certain condition is that the value indicating either the total number of print commands or the accumulated number of print commands by type exceeds a predetermined threshold number.

Preferably, in the print command generating apparatus described above, the predetermined threshold number is set according to the storage capacity of the storage unit of the printing apparatus.

Preferably, in the print command generating apparatus described above, the print commands are described by a PDL (page description language) adapted to the particular printing apparatus.

In addition, the above-described object of the present invention is also achieved by a print command generating method for generating print commands capable of being interpreted and printed by a particular printing apparatus, the method comprising:

a generating step of generating print commands in page units or band units;

a storage step of storing information relating to page unit print commands generated in the generating step; and a control step of causing the generating step to generate page unit print commands from the start of each page to be printed and to generate band unit print commands by realigning remaining print commands in band units if information relating to the page unit print commands stored in the storage step satisfies a certain condition.

In addition, the above-described object of the present invention is also achieved by a program that causes a computer to execute the print command generating method described above, a computer so programmed by the program, and a recording medium on which the computer program is stored.

Other objects, features, effects and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention, in which.

DETAILED DESCRIPTION OF THE PREFERRED EMBODIMENTS

Preferred embodiments of the present invention will be described in detail, in accordance with the accompanying drawings.

Figure 1:
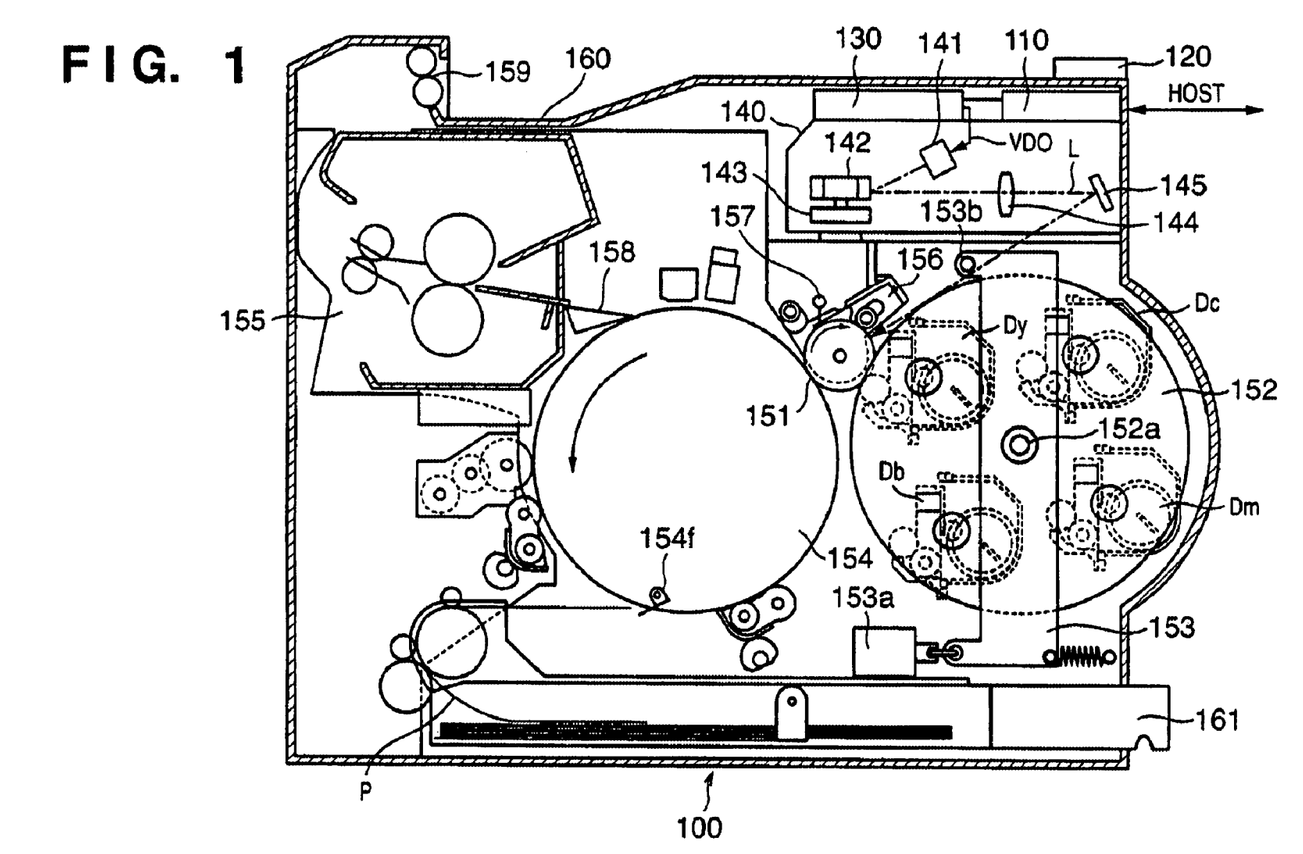
FIG. 1 is a lateral cross-sectional view of the structure of a laser color printer as one example of a printing apparatus in which the present invention is adopted.

FIG. 1 is a lateral cross-sectional view of the structure of a laser color printer as one example of a printing apparatus in which the present invention is adopted. The color laser printer shown in the diagram has a resolution of 600 dpi, and records images based on multivalic data in which color component pixels are expressed in units of 8 bits.

In FIG. 1, reference numeral 100 denotes the color laser printer main unit, which receives and stores print commands composed of print data (character codes, image data, etc.) and control codes supplied from an external host computer to which the color laser printer 100 is connected, and also creates character patterns and images in accordance with the print commands and forms visible images thereof on a recording medium. The recording medium may be recording paper, for example.

Reference numeral 110 denotes a formatter controller that analyzes the print commands supplied from the host computer and generates a print image as well as controls the color laser printer main unit 100. In addition, the formatter 110 is connected to a control panel 120 on which are arranged switches, LED displays and the like for the purpose of informing a user of the state of the printing apparatus 100 and enabling the user to control the operation of the printing apparatus 100. The control panel 120 may for example be mounted as a part of the housing of the printing apparatus 100.

The print image ultimately generated by the formatter controller 110 is output as a video signal to an output controller 130. Together with status inputs from various sensors (not shown in the diagrams) of the printing apparatus 100, the output controller 130 outputs control signals to an optical unit 140 and various drive systems so as to control the printing process of the printing apparatus 100.

In the printing apparatus 100 shown in FIG. 1, the leading edge of a sheet of recording paper P supplied from a paper supply cassette 161 is retained by a gripper 154f and held on the circumference of a transfer drum 154. An electrostatic potential image of a document image broken down into four colors and formed on a photosensitive drum 151 by the optical unit 140 is then rendered in sequence by yellow (Y), magenta (M), cyan (C) and black (B) color developers Dy, Dm, Dc and Db. The color toner images that result are transferred in layers to the recording paper P atop the transfer drum 154 and a multicolor image is formed on the recording paper P.

Thereafter, the recording paper P is separated from the transfer drum 154 and conveyed to an adhesive unit 155. At the adhesive unit 155, heat and pressure are used to fix the toner images to the recording paper P, after which the recording paper P is output to an output tray 160 by a delivery unit 159.

Here, the color developers Dy, Dm, Dc and Db are equipped with revolving axles by which they are rotatably supported by a developer selection mechanism 152, by which the Dy, Dm, Dc and Db can maintain a constant attitude even as the developer selection mechanism 152 rotates about an axle 152a.

After the selected developer has moved to the developing position, a solenoid 153a pulls a selection mechanism support frame 153 of the developer selection mechanism 152, together with the selected developer, toward the photosensitive drum 151.

Next, an electrostatic charger 156 gives the photosensitive drum 151 an electrostatic charge of uniform polarity. Print commands rendered as a device dependence bit map are converted into video signals of corresponding pattern by the formatter controller 110 and output to a laser driver so as to drive a semiconductor laser 141. The laser beam emitted from the semiconductor laser 141 is switched ON/OFF according to the input video signals and is then reflected by a polygon mirror 142 rotated at high speed by a scanner motor 143 onto the surface of the photosensitive drum 151 via a polygon lens 134 and a reflecting mirror 144 so as to scan the surface of the photosensitive drum 151, thus forming an electrostatic potential image on the surface of the photosensitive drum 151 that corresponds to the video signals.

Then, (for example) a magenta (M) electrostatic potential image is developed by the magenta developer Dm and a magenta-colored first toner image is formed on the photosensitive drum 151. At a given timing, the recording paper P is supplied, a transfer bias voltage having a polarity opposite that of the toner is applied to the transfer drum 154, the first toner image formed on the photosensitive drum 151 is transferred to the recording paper P and the recording paper P is electrostatically attached to the surface of the transfer drum 154.

Any residual magenta-colored toner is then removed from the photosensitive drum 151 by a cleaner 157 in preparation for the electrostatic potential image formation and development of the next color. Thereafter, by the same process as described above, second, third and fourth color toner images (i.e., cyan, yellow and black) are transferred. The only difference is that the bias voltage applied to the transfer drum 154 when transferring the colors is higher with each successive color transfer.

When the final four-color toner image has been produced by successive transfers of the color toner images, the recording paper P bearing the final four-color toner image is rotated so that the leading edge of the recording paper P approaches a separation point, at which a separator plate 158 approaches and contacts the surface of the transfer drum 154 and separates the recording paper P from the transfer drum 154. The recording paper P so separated is then conveyed to the adhesive unit 155, where the toner image on the recording paper P is fixed to the recording paper P and the recording paper P is then discharged to the output tray 160.

Through the image forming process described above, the color laser printer outputs an image having a resolution of 600 dpi. It should be noted that the types of printers that can be used as the printing apparatus in the present invention are not limited to the color laser printer described above but include inkjet printers and thermal printers also, as well as other types of color printers or black-and-white printers.

A description is now given of the configuration of the printing system of the present invention.

Figure 2:
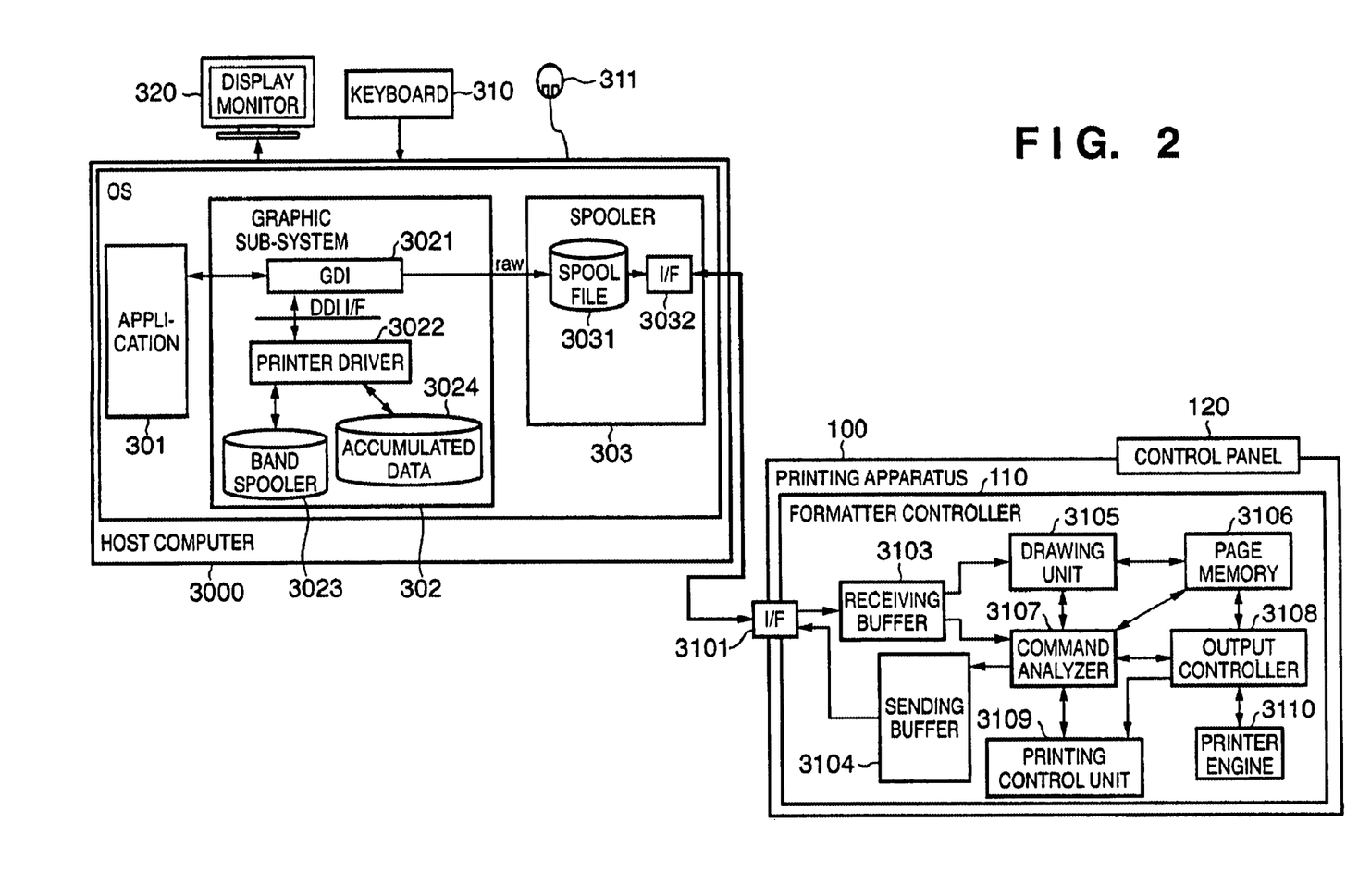
FIG. 2 is a block diagram showing the basic composition of an entire printing system according to one embodiment of the present invention.

FIG. 2 is a block diagram showing the basic composition of an entire printing system according to one embodiment of the present invention. As with the conventional printing system shown in FIG. 8 and FIG. 9, the printing system of the present invention as well is also configured so that a host computer 3000 and a printing apparatus 100 are communicably connected to each other.

For clarity, a description is first given of the formatter controller 110 of the printing apparatus 100, with reference to FIG. 2.

The formatter controller 110, which is also called a PDL controller, is composed of an interface (I/F) 3101 which is the means of connecting the printing apparatus 100 and the host computer 3000, a receiving buffer 3103 for holding data received, a sending buffer 3104 for holding data to be sent, a command analyzer 3107 that analyzes print data, a printing control unit 3109, a drawing unit 3105 and a page memory 3106.

The interface (I/F) 3101 is the communication means for sending and receiving print data to and from the host computer 3000, and enables communication based on a communications protocol such as, for example, IEEE-1284. However, it should be noted that the method of connecting the host computer 3000 and the printing apparatus 100 to each other is arbitrary, and may be accomplished in a variety of ways including, but not limited to, connection via a LAN computer network, for example, or via a serial interface such as a USB (Universal Serial Bus) or IEEE-1394.

Print data that is received through the interface 3101 is sequentially stored in the receiving buffer 3101 that is the storage means for temporarily storing such data, and is read and processed as needed by either the command analyzer 3107 or the drawing unit 3105. The command analyzer 3107 is composed of a control program based on the print command system and print job control language. The results of the analysis of print data with respect to the drawing of character printing, drawings, images and the like are processed on instruction by the drawing unit 3105. Commands other than drawing, such as paper selection and reset commands, are processed by output of instruction to the printing control unit 3109.

The drawing unit 3105 is a YMCK renderer that sequentially renders the drawing objects (i.e., characters and images) in the band memory within the page memory 3106.

For the color laser printer described above with reference to FIG. 1, it is necessary to transmit the device dependence bit map data in the sequence MCYK, but under normal conditions not all the necessary memory is reserved and a space consisting of a portion of a plane (1, 2 or 4 bits/pixel) is reserved within the page memory 3106 as band memory space. The band memory is then used repeatedly and drawing is synchronized with the printer engine 3110.

Normally, the page memory 3106 is managed by the banding control, which adds the process of shipping the video signals to the printer engine 3110 to the rendering process performed by the drawing unit 3105 as described above. However, if there is sufficient memory, memory space capable of rendering a page may be secured.

It should be noted that, in general, the formatter controller 110 is composed of a computer system employing a central processing unit (CPU), a read-only memory (ROM) and a random access memory (RAM). The processes performed by the various parts of the formatter controller 110 may be carried out by time-sharing under a multi-task monitor (real time OS) arrangement, or independently under an arrangement in which dedicated controller hardware for each function is installed separately.

The control panel 120, as described above, sets and displays the various states of the printing apparatus 100. An output controller 3108 converts the band memory (page memory) contents into video signals that are then sent to the printer engine 3110. The printer engine 3110 is a printing mechanism for the purpose of forming a permanent and visible image on the recording paper based on the video signals so received, and includes the various mechanisms described using FIG. 1.

A description is now given of the host computer, with reference to FIG. 2.

In FIG. 2, reference numeral 3000 denotes a host computer according to a preferred embodiment of an apparatus for generating a print command of the present invention, and outputs print data consisting of print data and control codes to the printing apparatus 100. The host computer 3000 is configured as a single computer system in which input devices such as a keyboard 310 and a mouse 311 as well as a display monitor 320, are connected to the host computer 3000. The host computer 3000 runs on operating software (OS) such as Windows.

Classifying functionally and broadly just those portions that relate to the present invention, the host computer side of the system comprises application software 301, graphic sub-system 302 and spooler 303 that includes spool file 3031 and the communications interface with the printing apparatus.

The application software 301 is a word processing or spreadsheet program that runs on an OS. The graphic sub-system 302 is composed of a Graphics Device Interface (hereinafter GDI) 3021 that is one part of the capabilities of the OS, a printer driver 3022 which is a device driver actively linked from the GDI, a band spooler 3023 and accumulated data 3024.

The printer driver 3022 is called up from the GDI 3021 through an interface 3101 called a DDI (Device Driver Interface) and performs processes adapted to the printing apparatus for each drawing object. In the host computer 3000 according to the present embodiment, two types of processing exist: One when information provided by the DDI function is converted into print command data (PDL) format which can be processed at high speed and sent directly to the spooler 303, and another when generated print command data is divided into band units and held as pages in the band spooler 3023 sequentially from the first band and the bands put together at the end of the page and sent to the spooler 303.

The spooler 303 is a spool file system that the OS manages. Depending on the settings, the spooler 303 stores print data in units of either a page or a job in the spool filer 3031 and sends it to the printing apparatus 100 via the I/F 3032.

Depending on the OS, the names of various parts and the functional framework described above may vary slightly. But such differences in nomenclature or outline do not affect the essence of the present invention. For example, the functions of the module called spooler and spool file in the present invention can be achieved by using a module that is in other OS called a print queue.

It should be noted that, in general, with the host computer 3000, which includes these various function modules, software called the OS coordinates control of such hardware as the CPU, ROM, RAM, and HDD (Hard Disk Drive), and it is under this OS that the various application program software and sib-system processes run as function modules.

Figure 3:
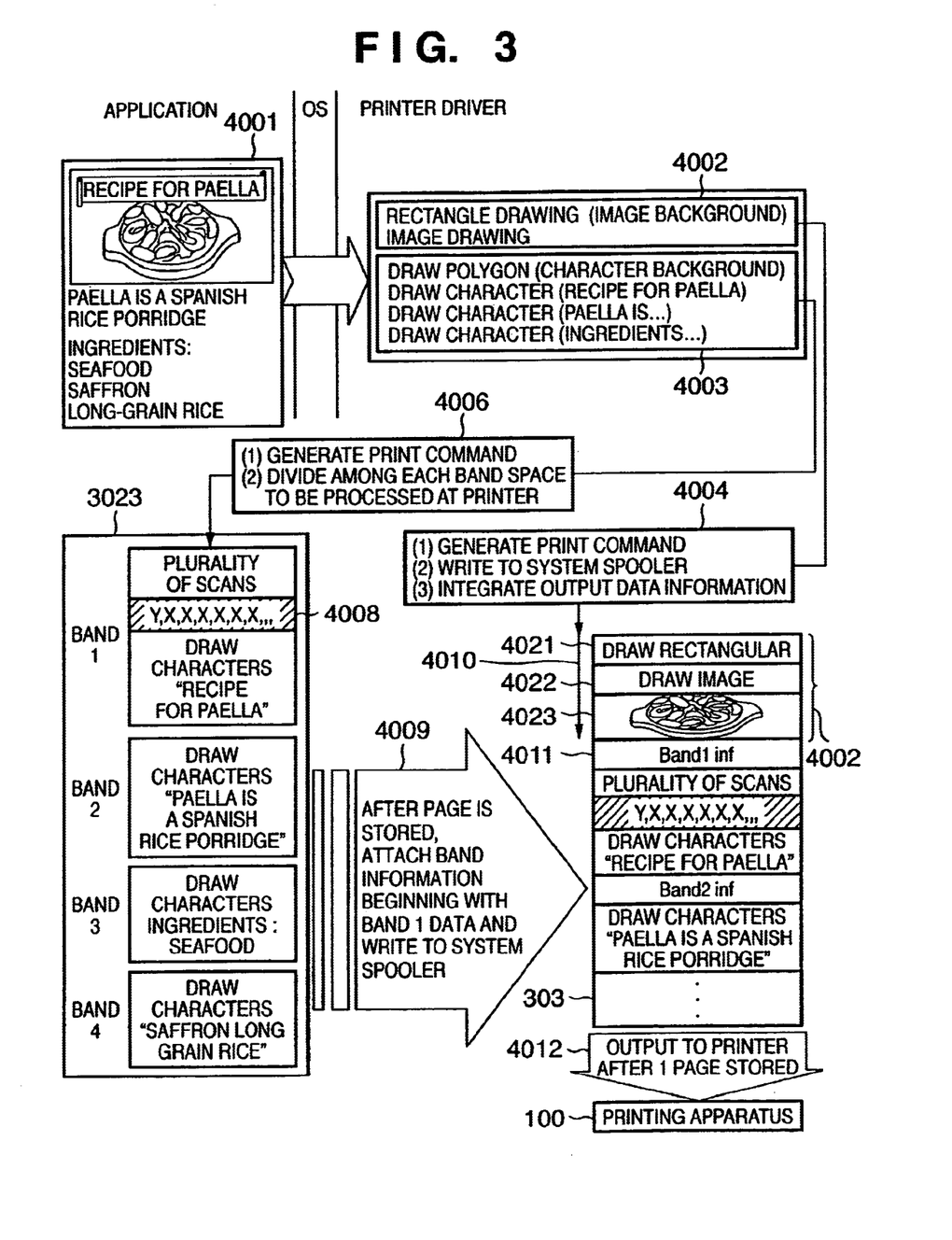
FIG. 3 is a diagram that schematically illustrates the outlines of processes performed by a printer driver according to one embodiment of the present invention.

A description is now given of the processes performed by the printer driver, with reference to FIG. 3.

FIG. 3 is a diagram that schematically illustrates the outlines of processes performed by a printer driver according to one embodiment of the present invention.

Reference numeral 4001 denotes a document created using an ordinary document creation application, and here includes graphics, text and images.

When printing out a document like that described above as document 4001, first, draw commands (4002, 4003) are transferred via the OS to the printer driver 3022 installed in the OS. In an initial state, the printer driver 3022 generates a print command (PDL) for each draw command and writes the print command to the system spooler 303 just as the typical PDL mode driver does. At this time, the printer driver 3022 integrates the data size as integrated (that is, accumulated) data 3024 calculated using a particular calculation formula according to the number and type of commands, the accumulated data 3024 then being stored, for example, in a particular space inside the RAM of the host computer. It should be noted that the draw commands (DDI functions) that the printer driver 3022 receives via the OS are output from the bottom layer of the multi-layered drawing object.

When an entire page of data is written to the system spooler 303, the print commands (PDL) saved as a spool file 3031 in the spooler 303 are sent to the printing apparatus 100, thus clearing the accumulated data 3024.

Whenever the value of the accumulated data 3024 exceeds a previously determined data size or command number, the printer driver 3022 switches to the routine described below.

In FIG. 3, reference numeral 4010 denotes a state in which "rectangular drawing (image background) 4021, image drawing command 4022 and image object 4023", indicated by reference numeral 4002, are stored in the system spooler 303.

In the present embodiment, when the image data 4023 is output to the system spooler 303, the printer driver 3022 switches processes whenever the accumulated data 3024 exceeds a previously determined data size threshold value.

The printer driver 3022 generates print commands for draw commands 4003 beginning with the image data 4023, which, at initialization, for example, the printer driver 3022 then divides into bands to be processed at the printing apparatus 100 and stores in the band spooler 3023 reserved as a particular space in the RAM in the order in which it is drawn (step 4006). The draw commands 403 (DDI functions) transferred from the OS are output without regard for the direction in which the printing apparatus 100 prints, so even where, as in the present embodiment, the printer driver 3022 switches to band processing in the middle of the page, all the bands within the page, from the first band to the Nth band, are stored.

The storage process is performed each time the DDI function in the printer driver is called up. When no more bands can be stored in the storage space inside the band space, new space is secured within the RAM (step 4009).

Attaching band information (step 4011) to the head of each piece of band data allows the printer driver 3022 to determine that the print data at the printing apparatus 100 has shifted from page units to band units.

When a page of print data has been spooled to the system spooler 303, it is output to the printing apparatus 100 (step 4012).

Figure 6:
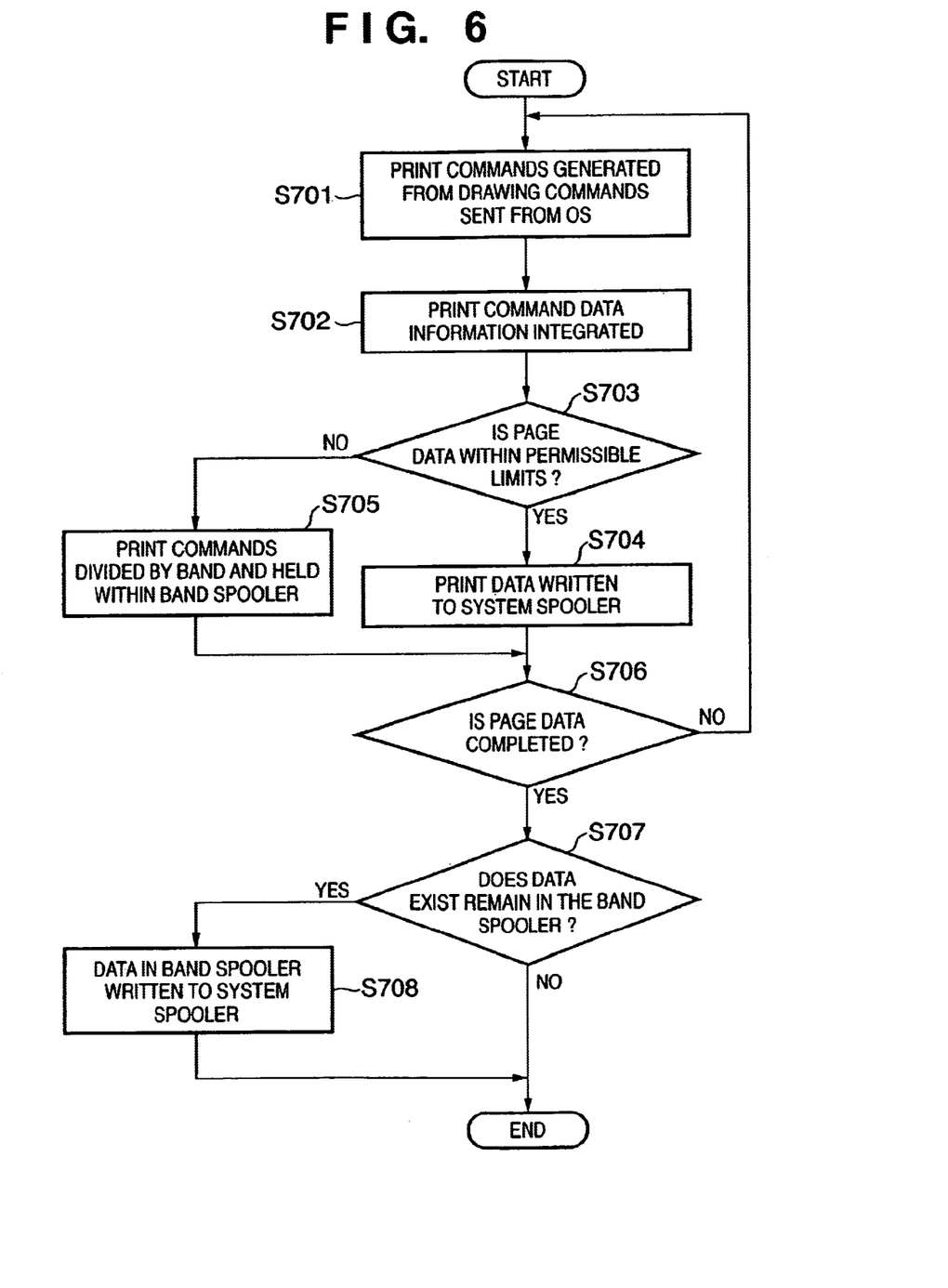
FIG. 6 is a flow chart illustrating steps in a process performed by the printer driver according to one embodiment of the present invention.

Next, a description is given of the process performed when the DDI function in the printer driver is called up, with reference to the flow chart of FIG. 6.

FIG. 6 is a flow chart illustrating steps in a process performed by the printer driver according to one embodiment of the present invention.

In a step S701, print command data that can be processed by the printing apparatus 100 is generated from the drawing commands sent from the OS.

In a step S702, the type and size of the print commands are integrated into the accumulated data 3024.

In a step S703, the results of the integration of step S702 are checked to determine whether or not they exceed a specified value. If the results of the integration of step S702 do exceed a specified value, then the process proceeds to a step S705. If the results of the integration of step S702 do not exceed a specified value, then the process proceeds to a step S704.

In step S704, the print command data is written to the system spooler 303 and the process proceeds to a step S706.

In step S705, the print command data is divided among the relevant bands and stored in the band spooler 3023.

In step 706, if processing of all the draw commands (page date) of a page is completed, the process proceeds to a step S707. If there are commands that are still unprocessed, then the process returns to step S701 and repeats.

In step S707, if there is print command data stored in the band spooler 3023, the process proceeds to a step S708. If the band spooler 3023 is empty the process ends.

In step S708, the print command data in the band spooler 3023 is written to the system spooler 303.

Figure 4:
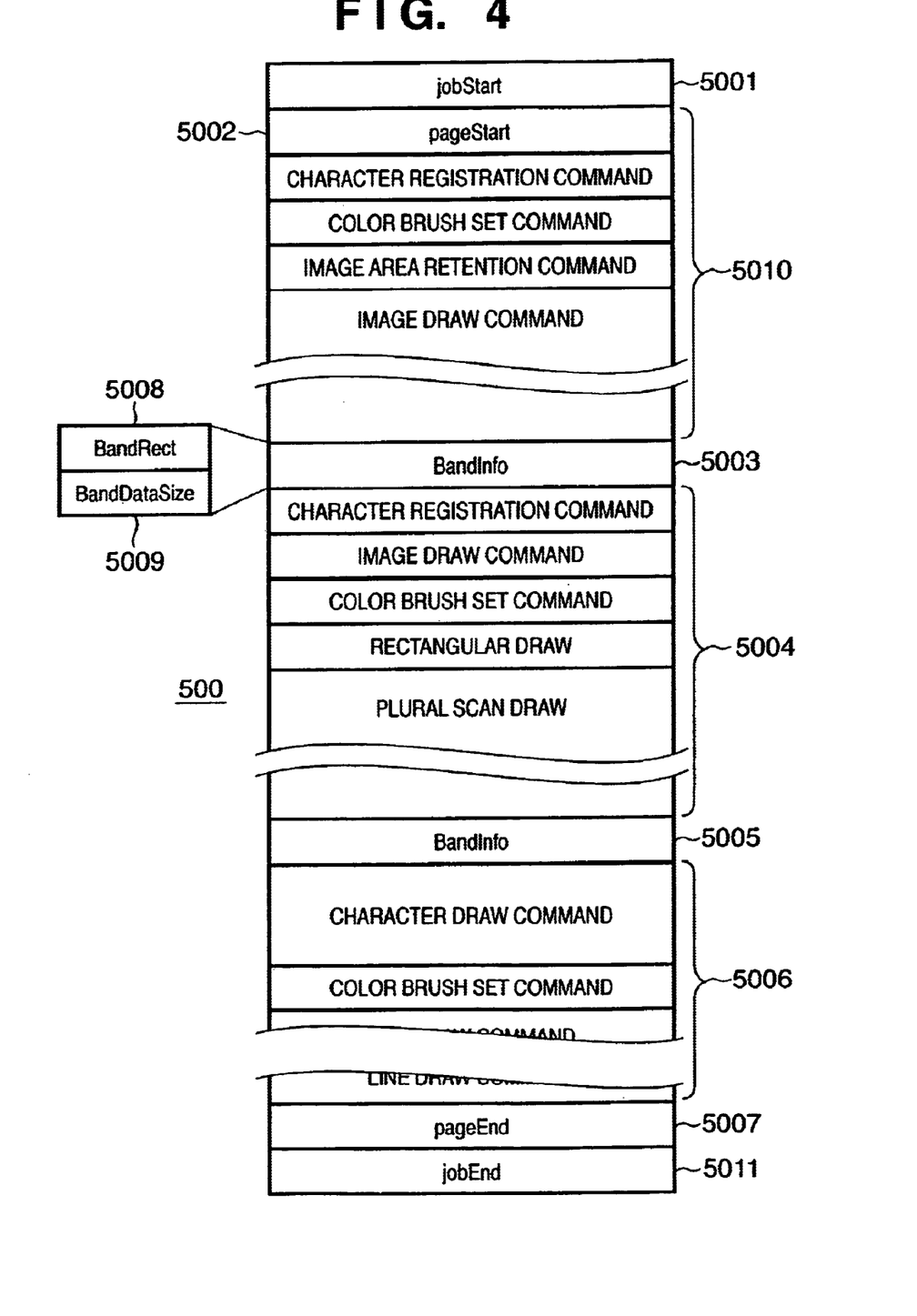
FIG. 4 is a schematic diagram showing an example of a print command structure used in a printing system according to one embodiment of the present invention.

A description is now given of an example of the configuration of print command data when switching from page units to band units in the middle of a page, using the schematic diagram shown in FIG. 4.

FIG. 4 is a schematic diagram showing an example of a print command structure used in a printing system according to one embodiment of the present invention.

Like the print command data generated by the conventional PDL mode printer driver, the print command data here also begins with jobStart 5001, followed by the pageStart 5002 that announces the start of a page.

In the print command data structure depicted in FIG. 4, the portion denoted by the reference numeral 5010 is page unit data. The portion of the print command data denoted by the reference numerals 5004, 5005 and 5006, which follows the page unit data portion and is headed by the band information command BandInfo 5003, is band unit data. The band information command BandInfo 5003 further includes the BandRect command 5008, which indicates the band space, and the BandDataSize 5009, which indicates the size of the print command data 5004 included in the band.

A band information command 5005 is once again inserted at the start of the next band unit data, which contains the print command data 5006.

A pageEnd command 5007 indicating the end of the page or a jobEnd command 5011 indicating the end of the print job is included at the end of a page of print command data, as with the print command data generated by the conventional PDL mode printer driver.

Figure 5:
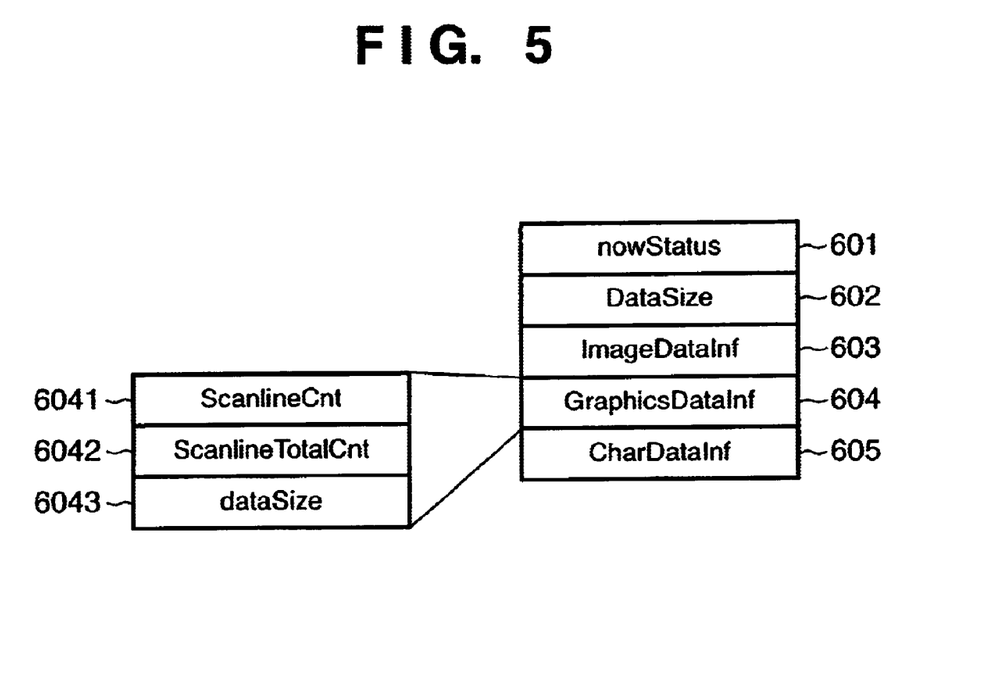
FIG. 5 is a schematic diagram showing an example of the data structure of accumulated data used in the host computer according to one embodiment of the present invention.

A description is now given of the accumulated data, with reference to FIG. 5.

FIG. 5 is a schematic diagram showing an example of the data structure of accumulated data used in the host computer according to one embodiment of the present invention.

The nowStatus 601 indicates whether the printer driver 3022 is currently processing in page units or band units. It should be noted that, in the present embodiment, processing in page units is the initial state.

The DataSize 602 indicates the size of the data of the entire page currently being processed. ImageDataInf 603, GraphicDataInf 604 and CharDataInf 605 indicate the number and size of the image, graphics and character data, respectively, within the page currently being processed.

With the processing of each draw command, the data size and number for each of the drawing elements are calculated and updated values are stored in the ImageDataInf 603, GraphicDataInf 604, CharDataInf 605 and DataSize 602.

If the value stored at the DataSize 602 exceeds a predetermined maximum data size (maxSize) for the printing apparatus driven by the printer driver, or if the total number of draw commands generated exceeds a predetermined maximum data size (maxSize) for the printing apparatus, the printer driver changes the value of the nowStatus 601 to a value corresponding to band unit processing, thereby switching the process to band unit processing.

A description is now given of the processes performed by the printing apparatus 100, which, by recognizing that the print command data received from the host computer 3000 has been changed at mid-page to band units, makes sub-close processing in band units possible.

In other words, since the conventional sub-close must continue to process in page units for page unit data as described above, the second and all subsequent sub closes, in the worst case the intermediate language might perform an image data expansion of all the relevant bands. Moreover, once a sub close occurs, since band bit map data compressed and held as intermediate data exists in the printer's internal memory, the amount of usable memory is sharply curtailed, which makes it easier for a sub-close to occur.

By contrast, according to the present invention, as described above with reference to FIG. 3, when the printer driver determines that there is a risk of a sub-close occurring based on the accumulated data the printer driver thereafter generates print commands in band units, so at least the data sent thereafter will be in band units if a sub-close does occur. Therefore, even with the occurrence of a second sub-close and with all subsequent sub-closes, that sub-close can be executed in single band units, with the following advantages:

1. Even if a sub-close occurs several times, the same band can be held in the band memory, so there is no repeated compression and expansion.

2. Since the process works if even one band of intermediate language can get into the band memory, it is harder for a second and any subsequent sub-close to occur than is the case with page unit data.

Figure 7:
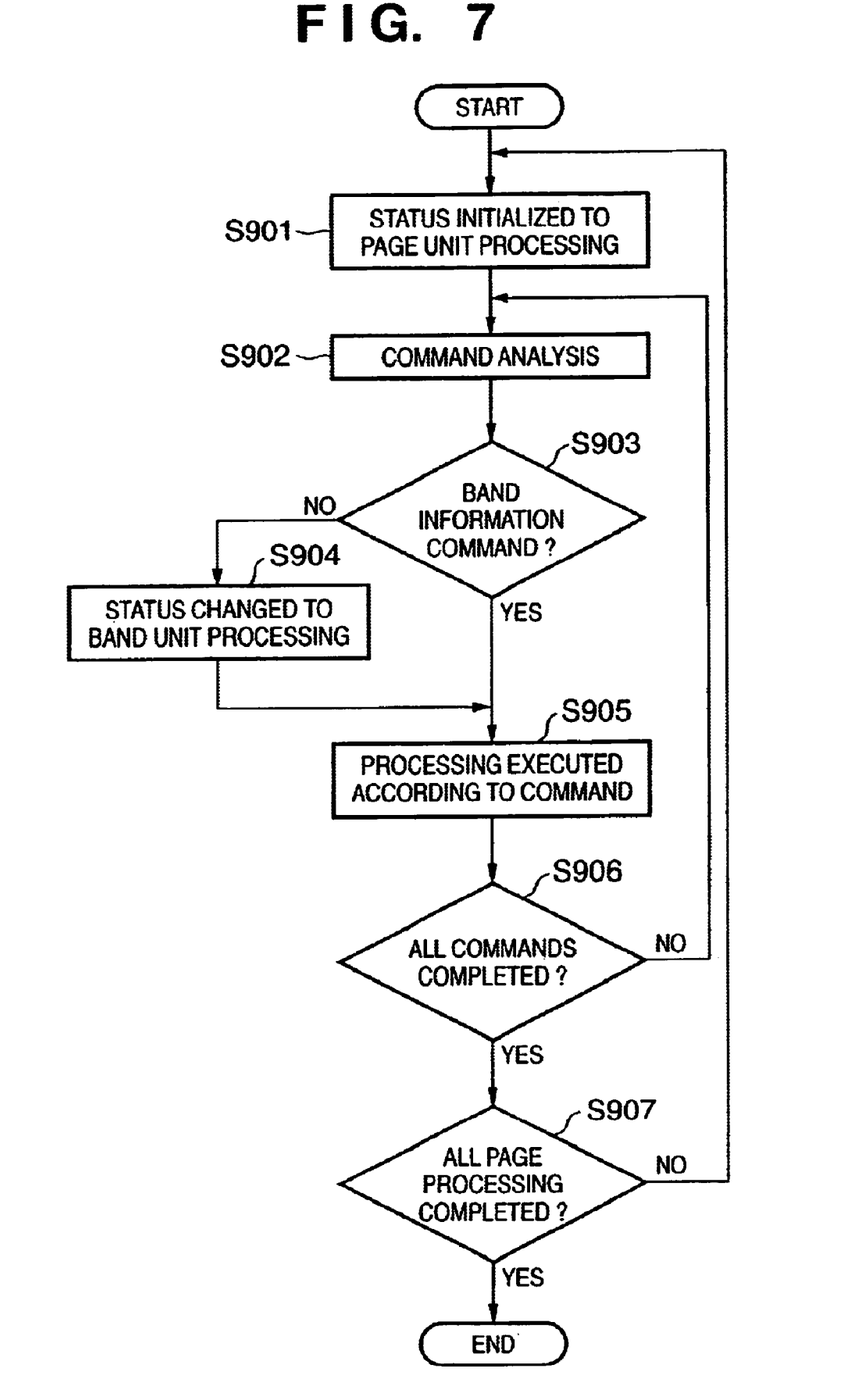
FIG. 7 is a flow chart illustrating processes performed by a printing apparatus according to one embodiment of the present invention.

A description is now given of steps in the process performed inside the printing apparatus 100 according to the present invention, with reference to FIG. 7.

In a step S901, the status of the printing apparatus is set initially to page unit processing.

In a step S902, a single command is obtained from the print command data received from the host computer and analyzed.

In a step S903, the results of the analysis performed in step S902 enable a determination to be made as to whether the command obtained from the host computer is the band information command BandInfo or not. If so, then the process proceeds to a step S904. If not, then the process proceeds to a step S905.

In step S904, the status of the printing apparatus is changed to band unit processing and subsequent processes are performed at the sub close step S905.

In step S905, the printer driver executes processes according to command and the process proceeds to a step S906. If the preceding step is step S903, the printer driver generates intermediate data from the print command and generates a display list. If the preceding step is step S904, subsequently received print commands are band unit print commands and a sub-close at the host computer is predicted, so a sub-close is performed in order to avoid causing a memory overflow.

In step S906, if analysis of all commands is completed the process proceeds to a step S907. If data remains, the process returns to step S902.

In a step S907, if processing of the entire page is complete the process ends. If processing is not complete, the process returns to step S901 and repeats.

A detailed description is now given of the processes performed in step S905 above. In step S905, the intermediate data is read in sequence from the first band of the display list already generated and is rendered to the band memory, thus generating the first band image data. Then the print commands of the first band obtained from the command analysis are rendered directly to the band memory. Thus, since the DDI transferred from the OS to the printer driver 3022 is generated in sequence from the bottom layer, in the printing apparatus as well, the intermediate data generated as a display list becomes the bottom layer, with the band print commands corresponding to the top layer.

As a result, drawing to the band memory may be by overwriting. When the first band has been drawn to the band memory, the first band is compressed and stored in the memory. Then the second band is drawn from the display list and the second band's print commands are drawn and compressed after band switching obtained from the command analysis. Thus sub-closes are performed for the first band through the Nth band to complete drawing of a page. When the drawing of a page is completed, a print request is made to the printer engine and the bands are expanded and read from the memory in sequence form the first band and output to the printer engine 3110 as video signals for printing.

It should be noted that, in FIG. 7, each time a band information command is received, in step S904 the status of the printing apparatus is initialized to band unit processing. However, as described above, in the present embodiment, data is transmitted only in band units once a shift is made in mid-page to band unit processing. Therefore, the routine described in FIG. 7 may be configured so that step S904 is performed only when the band information command is first received in the middle of a page.

As described above, when a switch is made to band unit processing in the middle of a page, performing a sub-close once does not lead to a memory overflow even if the print command is such as would normally lead to a memory overflow in the conventional art, and moreover, makes it possible to print at higher speeds than would be possible with the conventional sub-close processing.

In addition, although the above-described embodiment is described in terms of a host computer composed of a single device, the present invention may also be implemented by a system comprising a plurality of devices.

It should be noted that a software program for implementing the capabilities of the above-described embodiments (that is, a program corresponding to one or more of the flow charts shown in FIG. 6 or 7), supplied either directly from a recording medium or by using wire or wireless communications, to a system or apparatus having a computer capable of executing such program, the execution of such program by the computer of the system or apparatus achieving equivalent capabilities of the above-described embodiments, is included in the present invention.

Accordingly, a program supplied to and installed in such a computer for the purpose of implementing the functional processes of the present invention itself achieves the present invention. That is, a computer program for implementing the processes performed by the present invention is itself included within the present invention.

In such a case, provided the program capabilities are present, the format of the program, whether executed by object code or by an interpreter, for example, does not matter.

The recording media for supplying the program include, but are not limited to, magnetic recording media such as a floppy disk, a hard disk or magnetic tape, optical or magneto-optical recording media such as MO, CD-ROM, CD-R, CD-RW, DVD-ROM, DVD-R or DVD-RW, or a non-volatile semiconductor memory.

Wire and wireless methods of supplying the program to the system or apparatus described above include, but are not limited to, a computer program that forms the present invention on a server on the computer network, or storing a data file (that is, a program data file) that can become a computer program that forms the present invention on a client computer, such as a compressed file with a self-installing capability, and downloading the program data file to a connected client computer. In this case, the program data file can be divided into a plurality of segment files and the segment files disposed at different servers.

In other words, a server device that downloads to a plurality of users a program data file for implementing the function processes of the present invention by computer is also included within the present invention.

As can be appreciated by those of ordinary skill in the art, the program of the present invention may be encrypted and stored on a recording medium such as a CD-ROM and distributed to users, with decryption data for decrypting the encryption being made available to users who fulfill certain conditions for example by downloading from a home page via the Internet, the users then using the decryption data to execute the encrypted program for installation on a computer.

In addition, as can be appreciated by those of ordinary skill in the art, in addition to implementing the capabilities of the above-described embodiments by reading out and executing the above-described program by computer, the above-described capabilities of the embodiments described above can also be implemented by Operating System (OS) software running on a computer and performing some or all of the actual processes described heretofore based on the program instructions.

Moreover, the present invention also includes an instance in which the above-described capabilities of the embodiments described above are achieved by processes executed in whole or in part by a CPU or the like provided in a function expansion card or a function expansion unit based on program code instructions, after the program code read from the recording medium is written to a memory provided in such a function expansion card inserted into the computer or such a function expansion unit connected to the computer.

The present invention is not limited to the above embodiments, and various changes and modifications can be made within the spirit and scope of the present invention. Therefore, to apprise the public of the scope of the present invention, the following claims are made.

What is claimed is:

1. A print command generating apparatus for generating print commands capable of being interpreted and printed by a particular printing apparatus, the print command generating apparatus comprising:
   a command generating unit for generating print commands in page units or band units;
   a storage unit for storing information relating to page unit print commands generated by the command generating unit; and
   a control unit for causing the command generating unit to generate page unit print commands from the start of each page to be printed and to generate band unit print commands by realigning remaining print commands in band units if information relating to the page unit print commands stored in the storage unit satisfies a certain condition.

2. The print command generating apparatus according to claim 1, further comprising a switching data insertion unit for inserting data indicating a switch in print commands between the page unit print commands and the band unit print commands.

3. The print command generating apparatus according to claim 1, wherein:
   the information relating to the page unit print commands includes a value indicating accumulated data size by type of print command; and
   the certain condition is that the value indicating accumulated data size exceeds a predetermined threshold size.

4. The print command generating apparatus according to claim 3, wherein the predetermined threshold size is set according to the storage capacity of the storage unit of the printing apparatus.

5. The print command generating apparatus according to claim 1, wherein:
   the information relating to the page unit print commands includes a value indicating either the total number of print commands or the number of print commands by type; and
   the certain condition is that the value indicating either the total number of print commands or the accumulated number of print commands by type exceeds a predetermined threshold number.

6. The print command generating apparatus according to claim 5, wherein the predetermined threshold number is set according to the storage capacity of the storage unit of the printing apparatus.

7. The print command generating apparatus according to claim 1, wherein the print commands are described by a PDL (page description language) adapted to the particular printing apparatus.

8. An information processing apparatus communicably connected to a print command generating apparatus for generating print commands capable of being interpreted and printed by a particular printing apparatus, the print command generating apparatus comprising:
   a command generating unit for generating print commands in page units or band units;
   a storage unit for storing information relating to page unit print commands generated by the command generating unit; and
   a control unit for causing the command generating unit to generate page unit print commands from the start of each page to be printed and to generate band unit print commands by realigning remaining print commands in band units if information relating to the page unit print commands stored in the storage unit satisfies a certain condition.

9. A printing apparatus that prints according to print commands received, comprising:
   an analyzing unit for analyzing the print commands;
   an intermediate data generating unit for generating intermediate data from the print commands based on the analysis of the print commands by the analyzing unit;
   a drawing unit for drawing image data in a band memory; and
   a printing control unit for causing the drawing unit to draw intermediate data previously generated by the intermediate data generating unit in the band memory and drawing the print commands that follow a particular print command when, as a result of the analysis of the print commands by the analyzing unit, the particular print command is detected among the print commands included in the same page.

10. The printing apparatus according to claim 9, wherein the particular print command comprises switching data indicating a switch from page unit print commands to band unit print commands.

11. The printing apparatus according to claim 9, wherein the control unit compresses the band image data drawn in sequence from a first band and stores the compressed band image data in a storage unit.

12. A printing system composed of an information processing apparatus having a print command generating apparatus generating print commands capable of being interpreted and printed by a particular printing apparatus and a printing apparatus that prints according to print commands received, the information processing apparatus and the printing apparatus being communicably connected to each other,
   the print command generating apparatus comprising:
      a command generating unit for generating print commands in page units or band units;
      a storage unit for storing information relating to page unit print commands generated by the command generating unit; and
      a control unit for causing the command generating unit to generate page unit print commands from the start of each page to be printed and to generate band unit print commands by realigning remaining print commands in band units if information relating to the page unit print commands stored in the storage unit satisfies a certain condition;
   the printing apparatus comprising:
      an analyzing unit for analyzing the print commands;
      an intermediate data generating unit for generating intermediate data from the print commands based on the analysis of the print commands by the analyzing unit;
      a drawing unit for drawing image data in a band memory; and
      a printing control unit for causing the drawing unit to draw intermediate data previously generated by the intermediate data generating unit in the band memory and drawing the print commands that follow a particular print command when, as a result of the analysis of the print commands by the analyzing unit, the particular print command is detected among the print commands included in the same page.

13. A print command generating method for generating print commands capable of being interpreted and printed by a particular printing apparatus, the method comprising:
   a generating step of generating print commands in page units or band units;
   a storage step of storing information relating to page unit print commands generated in the generating step; and
   a control step of causing the generating step to generate page unit print commands from the start of each page to be printed and to generate band unit print commands by realigning remaining print commands in band units if information relating to the page unit print commands stored in the storage step satisfies a certain condition.

14. The print command generating method according to claim 13, further comprising an insertion step of inserting data indicating a switch in print commands between the page unit print commands and the band unit print commands.

15. The print command generating method according to claim 13, wherein:
   the information relating to the page unit print commands includes a value indicating accumulated data size by type of print command; and
   the certain condition is that the value indicating accumulated data size exceeds a predetermined threshold size.

16. The print command generating method according to claim 15, wherein the predetermined threshold size is set according to the storage capacity of a storage unit of the printing apparatus.

17. The print command generating method according to claim 13, wherein:
   the information relating to the page unit print commands includes a value indicating either the total number of print commands or the number of print commands by type; and
   the certain condition is that the value indicating either the total number of print commands or the accumulated number of print commands by type exceeds a predetermined threshold number.

18. The print command generating method according to claim 17, wherein the predetermined threshold number is set according to the storage capacity of the storage unit of the printing apparatus.

19. The print command generating apparatus according to claim 13, wherein the print commands are described by a (PDL) page description language adapted to the particular printing apparatus.

20. A printing apparatus control method for controlling a printing apparatus that prints according to print commands received, the control method comprising:

an analyzing step of analyzing the print commands;

a generating step of generating intermediate data from the print commands based on the analysis of the print commands in the analyzing step;

a drawing step of drawing image data in a band memory; and a printing control step of causing the drawing step to draw intermediate data previously generated by the generating step in the band memory and drawing the print commands that follow a particular print command when, as a result of the analysis of the print commands in the analyzing step, the particular print command is detected among the print commands included in the same page.

21. The control method according to claim 20, wherein the particular print command is switching data indicating a switch from page unit print commands to band unit print commands.

22. The control method according to claim 20, wherein the printing control step compresses the band image data drawn in sequence from a first band and stores the compressed band image data in a storage unit.

23. A program for causing a computer to execute a print command generating method for generating print commands capable of being interpreted and printed by a particular printing apparatus, the method comprising:

a generating step of generating print commands in page units or band units;

a storage step of storing information relating to page unit print commands generated in the generating step; and a control step of causing the generating step to generate page unit print commands from the start of each page to be printed and to generate band unit print commands by realigning remaining print commands in band units if information relating to the page unit print commands stored in the storage step satisfies a certain condition.

24. A general-purpose computer adapted by a program to operate as a special-purpose computer for executing a print command generating method for generating print commands capable of being interpreted and printed by a particular printing apparatus, the method comprising:

a generating step of generating print commands in page units or band units;

a storage step of storing information relating to page unit print commands generated by the generating step; and a control step of causing the generating step to generate page unit print commands from the start of each page to be printed and to generate band unit print commands by realigning remaining print commands in band units if information relating to the page unit print commands stored in the storage step satisfies a certain condition.

25. A computer-readable recording medium on which is stored a program for causing a computer to execute a print command generating method for generating print commands capable of being interpreted and printed by a particular printing apparatus, the method comprising:

a generating step of generating print commands in page units or band units;

a storage step of storing information relating to page unit print commands generated in the generating step; and a control step of causing the generating step to generate page unit print commands from the start of each page to be printed and to generate band unit print commands by realigning remaining print commands in band units if information relating to the page unit print commands stored in the storage step satisfies a certain condition.

\* \* \* \* \*